(12) United States Patent
Meisels et al.

(10) Patent No.: US 8,682,989 B2
(45) Date of Patent: Mar. 25, 2014

(54) MAKING DOCUMENT CHANGES BY REPLYING TO ELECTRONIC MESSAGES

(75) Inventors: Joshua Adam Meisels, Seattle, WA (US); Daniel Swett, Seattle, WA (US); Jason Frank Morrill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/096,830

(22) Filed: Apr. 28, 2011

(65) Prior Publication Data

US 2012/0278401 A1    Nov. 1, 2012

(51) Int. Cl.
G06F 15/16    (2006.01)

(52) U.S. Cl.
USPC .......................................................... 709/206

(58) Field of Classification Search
USPC ........................... 709/204–207; 715/751–753
See application file for complete search history.

(56) References Cited

U.S. PATENT DOCUMENTS

| | | | |
|---|---|---|---|
| 5,355,472 A | 10/1994 | Lewis | |
| 5,787,480 A | 7/1998 | Scales et al. | |
| 5,864,870 A | 1/1999 | Guck | |
| 5,903,723 A | 5/1999 | Beck | 709/200 |
| 6,219,818 B1 | 4/2001 | Freivald et al. | 714/799 |
| 6,275,850 B1 | 8/2001 | Beyda | 709/206 |
| 6,314,425 B1 | 11/2001 | Serbinis et al. | 1/1 |
| 6,493,758 B1 | 12/2002 | McLain | 709/227 |
| 6,533,822 B2 | 3/2003 | Kupiec | 715/253 |
| 6,718,368 B1 | 4/2004 | Ayyadurai | |
| 6,763,496 B1 | 7/2004 | Hennings et al. | |
| 6,782,423 B1 | 8/2004 | Nakayama et al. | |
| 6,839,741 B1 | 1/2005 | Tsai | |
| 6,954,934 B2 | 10/2005 | Kumar | |
| 6,978,276 B2 | 12/2005 | Demsky et al. | |
| 7,003,551 B2 | 2/2006 | Malik | |
| 7,028,075 B2 | 4/2006 | Morris | 709/206 |

(Continued)

FOREIGN PATENT DOCUMENTS

| | | |
|---|---|---|
| JP | 2008-500646 | 1/2008 |
| WO | 2007/133504 | 11/2007 |

OTHER PUBLICATIONS

Microsoft; "Going beyond e-mail: Collaborating with Office"; Retrieved Date: Jan. 4, 2010; http://office.microsoft.com/en-us/outlook-help/going-beyond-e-mail-collaborating-wilh-office-HA001017429.aspx; 10 pgs.

(Continued)

Primary Examiner — Brendan Higa
(74) Attorney, Agent, or Firm — Thomas Wong; Brian Haslam; Micky Minhas

(57) ABSTRACT

Document changes are sent within a body of an electronic message to reviewers that are collaborating on the document. The document may be any type of document to which changes/comments are made, such as word processing documents, spreadsheets, slides, and the like. A reviewer receiving the electronic message may accept/reject changes and/or make comments/modifications to the document changes that are contained within the electronic message. For example, a reviewer may edit the document changes that are included within the body of the electronic message to add a comment and/or make changes to the change. A reviewer may also have the option to accept/reject changes directly from within the electronic message. After making any changes, the reviewer replies to the electronic message and the changes that are included within the electronic message are applied to the document.

20 Claims, 9 Drawing Sheets

(56) References Cited

U.S. PATENT DOCUMENTS

| | | | |
|---|---|---|---|
| 7,054,905 B1 | 5/2006 | Hanna et al. | |
| 7,107,518 B2 | 9/2006 | Ramaley et al. | 715/235 |
| 7,127,670 B2 | 10/2006 | Bendik | 715/200 |
| 7,130,885 B2 | 10/2006 | Chandra et al. | 709/206 |
| 7,143,091 B2 | 11/2006 | Charnock et al. | 1/1 |
| 7,178,099 B2 | 2/2007 | Meyer et al. | 715/210 |
| 7,194,514 B1 | 3/2007 | Yen et al. | 709/206 |
| 7,290,034 B2 | 10/2007 | Budd et al. | 709/206 |
| 7,353,232 B1 | 4/2008 | Kalucha et al. | |
| 7,392,280 B2 | 6/2008 | Rohall et al. | 709/201 |
| 7,401,291 B2 | 7/2008 | Ramaley et al. | |
| 7,409,394 B2 | 8/2008 | Lee | 1/1 |
| 7,409,424 B2 | 8/2008 | Parker | 709/206 |
| 7,424,676 B1* | 9/2008 | Carlson et al. | 715/273 |
| 7,509,386 B2 | 3/2009 | Miyashita | |
| 7,536,440 B2 | 5/2009 | Budd et al. | 709/206 |
| 7,546,352 B1 | 6/2009 | Bhattiprolu et al. | |
| 7,565,409 B2 | 7/2009 | Heilbron et al. | |
| 7,580,982 B2 | 8/2009 | Owen et al. | |
| 7,650,387 B2 | 1/2010 | Foo | 709/214 |
| 7,730,082 B2 | 6/2010 | Sah et al. | 707/770 |
| 7,752,269 B2 | 7/2010 | Chan et al. | |
| 7,783,711 B2 | 8/2010 | LeVasseur et al. | |
| 7,783,972 B2 | 8/2010 | Camps et al. | 715/255 |
| 7,840,642 B2 | 11/2010 | Naick et al. | |
| 8,108,464 B1* | 1/2012 | Rochelle et al. | 709/205 |
| 8,140,975 B2* | 3/2012 | Lemay et al. | 715/730 |
| 8,145,707 B2 | 3/2012 | Thayer et al. | |
| 8,176,123 B1 | 5/2012 | Wang et al. | |
| 8,185,591 B1 | 5/2012 | Lewis | |
| 2001/0051991 A1 | 12/2001 | Beyda et al. | |
| 2002/0016818 A1 | 2/2002 | Kirani et al. | |
| 2002/0059384 A1 | 5/2002 | Kaars | |
| 2002/0062356 A1 | 5/2002 | Clarke et al. | |
| 2002/0065892 A1 | 5/2002 | Malik | |
| 2002/0107931 A1* | 8/2002 | Singh et al. | 709/206 |
| 2002/0129056 A1 | 9/2002 | Conant et al. | |
| 2002/0143691 A1* | 10/2002 | Ramaley et al. | 705/37 |
| 2002/0174010 A1 | 11/2002 | Rice | |
| 2003/0028528 A1 | 2/2003 | Christensen et al. | |
| 2003/0055907 A1 | 3/2003 | Stiers | 709/206 |
| 2004/0068545 A1 | 4/2004 | Daniell et al. | |
| 2004/0103044 A1 | 5/2004 | Vandewater et al. | 705/26.1 |
| 2004/0158607 A1 | 8/2004 | Coppinger et al. | 709/206 |
| 2004/0186894 A1 | 9/2004 | Jhingan et al. | 709/207 |
| 2005/0033813 A1* | 2/2005 | Bhogal et al. | 709/206 |
| 2005/0060382 A1 | 3/2005 | Spector | 709/213 |
| 2005/0122345 A1 | 6/2005 | Kim et al. | |
| 2005/0166154 A1 | 7/2005 | Wilson | 715/751 |
| 2005/0188026 A1 | 8/2005 | Hilbert et al. | 709/206 |
| 2005/0251443 A1 | 11/2005 | Chan et al. | 705/14.721 |
| 2005/0289221 A1 | 12/2005 | Steele | |
| 2006/0020673 A1* | 1/2006 | Sorge et al. | 709/206 |
| 2006/0031309 A1 | 2/2006 | Luoffo et al. | 709/206 |
| 2006/0075046 A1 | 4/2006 | Yozell-Epstein et al. | |
| 2006/0195526 A1 | 8/2006 | Lederer et al. | 709/206 |
| 2006/0206570 A1 | 9/2006 | Heidloff et al. | 709/206 |
| 2006/0259524 A1 | 11/2006 | Horton | 1/1 |
| 2006/0282762 A1 | 12/2006 | Diamond et al. | 715/235 |
| 2006/0294455 A1 | 12/2006 | Morris et al. | |
| 2007/0005717 A1 | 1/2007 | LeVasseur et al. | |
| 2007/0022166 A1 | 1/2007 | Bhogal et al. | 709/206 |
| 2007/0118794 A1 | 5/2007 | Hollander et al. | |
| 2007/0130259 A1 | 6/2007 | Daniell et al. | |
| 2007/0143419 A1 | 6/2007 | Plas | 709/206 |
| 2007/0143425 A1 | 6/2007 | Kieselbach et al. | 709/206 |
| 2007/0168459 A1 | 7/2007 | Fujita et al. | |
| 2007/0192490 A1 | 8/2007 | Minhas | |
| 2007/0198913 A1 | 8/2007 | Terao et al. | |
| 2007/0208782 A1 | 9/2007 | Carter et al. | |
| 2007/0233794 A1 | 10/2007 | Singh | |
| 2007/0271502 A1 | 11/2007 | Bedi et al. | |
| 2007/0283267 A1 | 12/2007 | Jeffrey et al. | |
| 2008/0005139 A1 | 1/2008 | Hysom et al. | |
| 2008/0028017 A1 | 1/2008 | Garbow et al. | |
| 2008/0059539 A1 | 3/2008 | Chin et al. | |
| 2008/0120382 A1* | 5/2008 | Heidloff et al. | 709/206 |
| 2008/0250474 A1* | 10/2008 | Bhogal et al. | 726/1 |
| 2008/0281924 A1 | 11/2008 | Gadwale | 709/206 |
| 2008/0282159 A1 | 11/2008 | Vanderwende et al. | 715/700 |
| 2008/0288862 A1* | 11/2008 | Smetters et al. | 715/255 |
| 2009/0063520 A1 | 3/2009 | Kimura | |
| 2009/0094514 A1* | 4/2009 | Dargahi et al. | 715/255 |
| 2009/0157831 A1 | 6/2009 | Tian et al. | 709/206 |
| 2009/0187852 A1 | 7/2009 | Tsuruta | |
| 2009/0248808 A1 | 10/2009 | Izumi et al. | 709/206 |
| 2009/0313256 A1 | 12/2009 | Konduri et al. | 1/1 |
| 2009/0319618 A1 | 12/2009 | Affronti et al. | 709/206 |
| 2010/0011032 A1 | 1/2010 | Fukuoka | |
| 2010/0017701 A1* | 1/2010 | Bargeron et al. | 715/230 |
| 2010/0057765 A1 | 3/2010 | Dispensa et al. | 707/102 |
| 2010/0057864 A1 | 3/2010 | Laird-McConnell | |
| 2010/0070448 A1 | 3/2010 | Omoigui | |
| 2010/0070588 A1 | 3/2010 | Sinn et al. | |
| 2010/0082713 A1 | 4/2010 | Frid-nielsen et al. | 707/821 |
| 2010/0095198 A1 | 4/2010 | Bultrowicz et al. | 715/234 |
| 2010/0125640 A1 | 5/2010 | Boddington et al. | |
| 2010/0169295 A1 | 7/2010 | Kanamori | |
| 2010/0169439 A1 | 7/2010 | O'Sullivan et al. | |
| 2010/0169440 A1 | 7/2010 | O'Sullivan | 709/206 |
| 2010/0191774 A1 | 7/2010 | Mason et al. | |
| 2010/0198927 A1 | 8/2010 | Tonnison et al. | 709/206 |
| 2010/0228611 A1 | 9/2010 | Shenfield | |
| 2010/0228989 A1 | 9/2010 | Neystadt et al. | |
| 2010/0281224 A1 | 11/2010 | Ho et al. | |
| 2010/0306180 A1 | 12/2010 | Johnson et al. | |
| 2010/0306330 A1 | 12/2010 | Friedman et al. | 709/206 |
| 2011/0066955 A1* | 3/2011 | Olson et al. | 715/752 |
| 2011/0113104 A1 | 5/2011 | Bhogal et al. | |
| 2011/0145363 A1 | 6/2011 | Ananthanarayanan et al. | |
| 2011/0276897 A1* | 11/2011 | Crevier et al. | 715/752 |
| 2012/0095890 A1 | 4/2012 | Santarlas | |
| 2012/0151379 A1 | 6/2012 | Schultz et al. | |
| 2012/0192064 A1 | 7/2012 | Antebi et al. | |
| 2012/0278281 A1 | 11/2012 | Meisels et al. | |
| 2012/0278402 A1 | 11/2012 | Limont et al. | |
| 2012/0278403 A1 | 11/2012 | Costenaro et al. | |
| 2012/0278404 A1 | 11/2012 | Meisels et al. | |
| 2012/0278405 A1 | 11/2012 | Costenaro et al. | |
| 2012/0278407 A1 | 11/2012 | Meisels et al. | |
| 2012/0284344 A1 | 11/2012 | Costenaro et al. | |
| 2012/0284345 A1 | 11/2012 | Costenaro et al. | |

OTHER PUBLICATIONS

Gigaom.com; "How to Use Adobe Acrobat for Online Document Reviews"; Retrieved Date: Jan. 4, 2010; http://gigaom.com/collaboration/how-to-use-adobe-acrobat-for-online-document-review/; 8 pgs.

Masternewmedia.org; "Collaborative Document Review Online: PleaseReview"; Retrieved Date: Jan. 4, 2010; http://www.masternewmedia.org/news/2005/06/02/collaborative_document_review_online_pleasereview.htm; 4 pgs.

Decouchant et al.; "Griffon: A Cooperative, Structured, Distributed Document Editor"; 1993; http://citeseerx.ist.psu.edu/viewdoc/download?doi=10.1.1.51.759&rep=rep1&type=pdf; 28 pages.

Devendorf, G.; "Outlook putting attachments in Sharepoint"; Feb. 13, 2008; http://my.advisor.com/blog/garydev.nsf/d6plinks/GDEF-7BSUA2; 5 pages.

Edholm, Y.; "Email Attachments: The Scourge of the Network"; Jul. 21, 2008; solutions-daily.com; http://www.solutions-daily.com/dsp_getFeaturesDetails.cfm?CID=691; 3 pg.s.

Egnyte.co; "Cloud File Server Features—Complete List"; accessed Dec. 30, 2010, at http://www.egnyte.co.uk/file-server/online-file-server-features.html; 5 pgs.

Harmoni.ie; "harmon.ie for SharePoint"; accessed Apr. 1, 2011 at http://harmon.ie/SharePoint/Product/Features/CollaborateUsingDocuments; 3 pgs.

Hsieh, H., et al.; "Activity Links: Supporting Communication and Reflection about Action"; Center for the Study of Digital Libraries and Dept. of Computer Science, Texas A&M University, USA; HT '05 Sep. 6-9, 2005, Salzburg, AT; 10 pgs.

(56) References Cited

OTHER PUBLICATIONS

Jatowt, A., et al.; "Change Summarization in Web Collections"; University of Tokyo, Japan; 2004; accessed on or about Jan. 4, 2010 at http://citeseerx.ist.psu.edu/viewdoc/download?doi=10.1.1.73.7999&rep=rep1&type-pdf; 10 pgs.
Lenahan, T.; "5 New Google Docs Features You Might Have Missed"; Apr. 6, 2010; http://www.makeuseof.com/tag/5-google-docs-features-making/; 9 pgs.
McCoy, J., et al.; "SharePoint Workspace and the Office Document Cache"; Mar. 12, 2010-Sep. 29, 2010; retrieved Dec. 30, 2010, at http://blogs.msdn.com/b/sharepoint_workspace_development_team/archive/2010/03/12/sharepoint-workspace-and-the-office-document-cache.aspx; 2 pgs.
Microsoft Support; "Attachment Manager for Outlook"; accessed Jan. 7, 2011, at http://assistmyteam.com/downloads/manuals/AttachmentManager.pdf; 14 pgs.
Microsoft Support; "OL2000: Changing from Local Delivery to Server and Offline"; Oct. 8, 2003, rev. 1.0; accessed Jan. 7, 2011 at http://support.microsoft.com/kb/197651; 4 pgs.
Microsoft Support; "You may receive an 'Outlook blocked access to the following potentially unsafe attachments' message in Outlook"; Last Review: May 13, 2010; http://support.microsoft.com/kb/829982; 7 pgs.
Office-Addins.com; "Attachments Processor for Microsoft Outlook"; accessed Jan. 6, 2011, at http://www.-office-addins.com/-outlook-addins/attachments-processor.html; 3 pgs.
phpBB—Free and Open Source Forum Software; "Display last edited time information"; accessed Jan. 6, 2011, at http://www.phpbb.com/community/viewtopic.php?f=46&t=589514; 7 pgs.
Redline-Software.com; "Outlook Connector for MDaemon"; accessed Jan. 6, 2011, at http://www.redline-software.com/eng/support/docs/mdaemon/c6s4.php; 7 pgs.
RSBR.de; "Outlook Attachment Sniffer"; accessed Jan. 6, 2011, at http://www.rsbr.de/Software/OASniffer/index.htm; 2 pgs.
Sharepoint Development; "How to show last modified workflow date in a column on the main list page"; Jul. 31, 2009-Aug. 4, 2009; accessed Jan. 6, 2011, at http://www.sharepointdev.net/sharepoint--design-customization/how-to-show-last-modified-workflow-date--in-a-column-on-the-main-list-page-5094.shtml; 4 pgs.
Thapa, S.; "Microsoft SharePoint 2010—Features and Benefits"; Dec. 1, 2010; EzineMark.com; 3 pgs.
The Daily Reviewer; "Outlook Shared Attachment as Hyperlink"; accessed Dec. 30, 2010, at http://thedailyreviewer.com/windowsapps/view/outlook-shared-attachment-as-hyperlink-11367085; 5 pgs.
U.S. Appl. No. 12/963,091, entitled *Shared Attachments*, filed Dec. 8, 2010.
U.S. Appl. No. 13/096,854 entitled *Presenting Links to Content as Attachments in Electronic Messages*, filed Apr. 28, 2011.
U.S. Appl. No. 13/096,869, entitled *Presenting Link Information Near Links Within Electronic Messages*, filed Apr. 28, 2011.
U.S. Appl. No. 13/096,880, entitled *Upload of Attachment and Insertion of Link Into Electronic Messages*, filed Apr. 28, 2011.
U.S. Appl. No. 13/096,899, entitled *Storing Metadata Inside File to Reference Shared Version of File*, filed Apr. 28, 2011.
U.S. Appl. No. 13/102,431, entitled *Changes to Documents are Automatically Summarized in Electronic Messages*, filed May 6, 2011.
U.S. Appl. No. 13/102,875, entitled *Setting Permissions for Links Forwarded in Electronic Messages*, filed May 6, 2011.

U.S. Appl. No. 13/096,936, entitled *Automatic Uploading of Attachment to a Shared Location*, filed Apr. 28, 2011.
Office Action dated Jun. 20, 2012, issued in U.S. Appl. No. 13/096,899.
Office Action dated Sep. 7, 2012, issued in U.S. Appl. No. 12/963,0919.
Office Action dated Feb. 11, 2013, issued in U.S. Appl. No. 13/096,899.
PCT Search Report in PCT/US2012/035710 dated Sep. 28, 2012.
Office Action dated Nov. 13, 2012, issued in U.S. Appl. No. 13/096,910.
PCT Search Report in PCT/US2012/035707 dated Nov. 26, 2012.
PCT Search Report in PCT/US2012/035708 dated Nov. 26, 2012.
PCT Search Report in PCT/US2012/035709 dated Nov. 26, 2012.
PCT Search Report in PCT/US2012/036701 dated Nov. 28, 2012.
PCT Search Report in PCT/US2012/036702 dated Dec. 3, 2012.
Office Action dated Nov. 21, 2012, issued in U.S. Appl. No. 13/096,936.
Office Action dated Nov. 26, 2012, issued in U.S. Appl. No. 13/102,431.
Office Action dated Dec. 11, 2012, issued in U.S. Appl. No. 13/096,854.
Office Action dated Dec. 14, 2012, issued in U.S. Appl. No. 13/096,869.
Office Action dated Dec. 26, 2012, issued in U.S. Appl. No. 13/096,880.
Office Action dated Jan. 2, 2013, issued in U.S. Appl. No. 13/102,875.
Office Action dated Jan. 9, 2013, issued in U.S. Appl. No. 12/963,091.
Docstoc; "OneClick: Email Large Documents Without Attaching Files"; retrieved Jan. 7, 2011, from http://www.docstoc.com/oneclick/; 4 pgs.
Masternewmedia.com; "How to Send Large Files without Email"; Last updated: Jan. 6, 2011; retrieved Jan. 7, 2011, from http://www.masternewmedia.org/how_to_send_large_files_without_email/; 3 pgs.
MSDN.com; "How to Share Large Files Without Attaching Them"; Aug. 21, 2008; retrieved Jan. 7, 2011, from http://blogs.msdn.com/b/outlook/archive/2008/08/21/how-to-share-large-files-without-attaching-them.aspx; 3 pgs.
Sendthisfile.com; "Welcome to SendThisFile"; accessed Jan. 7, 2011, from http://www.sendthisfile.com/; 1 pg.
Office Action dated Jun. 4, 2013, issued in U.S. Appl. No. 13/096,936.
Office Action dated Jun. 10, 2013, issued in U.S. Appl. No. 13/102,431.
Office Action dated Jun. 11, 2013, issued in U.S. Appl. No. 13/096,910.
Office Action dated Jun. 20, 2013, issued in U.S. Appl. No. 13/096,854.
Office Action dated Jun. 21, 2013, issued in U.S. Appl. No. 13/096,869.
Office Action dated Jul. 16, 2013, issued in U.S. Appl. No. 13/096,880.
Office Action dated Sep. 24, 2013, issued in U.S. Appl. No. 13/096,899.
Office Action dated Nov. 22, 2013, issued in U.S. Appl. No. 13/102,875.
Office Action dated Jan. 15, 2014, issued in U.S. Appl. No. 13/096,854.

* cited by examiner

MAKING DOCUMENT CHANGES BY REPLYING TO ELECTRONIC MESSAGES

BACKGROUND

Authors of documents routinely email documents to other users for review. A user receiving the document for review opens the attached document, makes any changes/comments in the document and emails the document back to the author. It is often difficult for users to keep up with all of the different changes made to the document by their co-authors or editors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Document changes are sent within a body of an electronic message to reviewers that are collaborating on the document. The document may be any type of document to which changes/comments are made, such as word processing documents, spreadsheets, slides, and the like. A reviewer receiving the electronic message may accept/reject changes and/or make comments/modifications to the document changes that are contained within the electronic message. For example, a reviewer may edit the document changes that are included within the body of the electronic message to add a comment and/or make changes to the change. A reviewer may also have the option to accept/reject changes directly from within the electronic message. After making any changes, the reviewer replies to the electronic message and the changes that are included within the electronic message are applied to the document.

DETAILED DESCRIPTION

Figure 1:
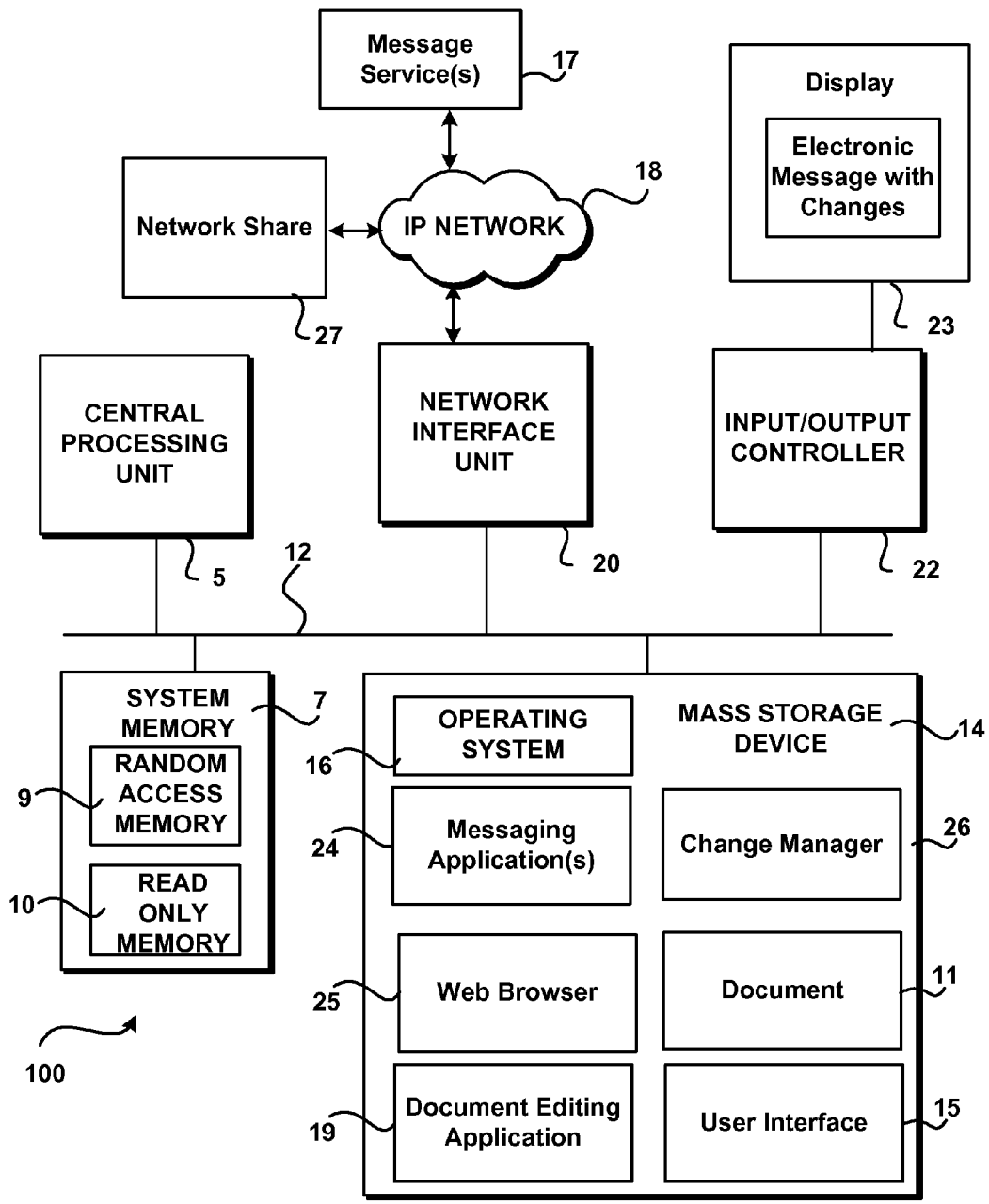
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, document 11, messaging application(s) 24, Web Browser 25, document editing application 19 and change manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, including a document editing application 19, messaging application(s) 24 and Web Browser 25. According to an embodiment, the document editing application 19 is a word processing application, such as the MICROSOFT WORD application. Other document editing applications may also be used. The document editing application may be configured to interact with spreadsheets, slides, notes, and the like.

A user interface 15 is used by a user to interact with applications and documents. For example, document 11 may be edited using the user interface. Document editing application 19 is configured to perform editing operations on a document, such as document 11. For example, a user may change/add/remove words from a document, change the formatting of the document, add a picture, table, and the like using document editing application 19.

Messaging application(s) 24 may be one or more different messaging applications. For example, computing device 100 may include an email application, an Instant Messaging (IM) application, an SMS, MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE or some other network based email and messaging service.

Network share 27 is configured to store documents that are accessible to one or more users through IP network 18. For example, network share 27 may store a document that is being collaborated on by different reviewers located at one or more locations. A document may be stored in more than one location. For example, a copy of document 11 may be stored on computing device 100 and at network share 27. A copy of the document may also be maintained in other locations.

Change manager 26 is configured to create and process electronic messages that are used in making document changes. Change manager 26 may be located externally from a document editing application 19 as shown or may be a part of document editing application 19 an/or some other application. Further, all/some of the functionality provided by change manager 26 may be located internally/externally from document editing application 19. Change manager 26 is configured to determine and place document changes within a body of an electronic message that is sent to reviewers that are collaborating on the document. The document may be any type of document to which changes are made, such as word processing documents, spreadsheets, slides, and the like. A reviewer receiving the electronic message may accept/reject changes and/or make comments/text modifications to the document changes that are contained within the electronic message. For example, a reviewer may edit the document changes that are included within the body of the electronic message to add a comment and/or make changes. A reviewer may also accept/reject changes directly from within the electronic message. After making any changes, the reviewer replies to the electronic message and the changes that are included within the electronic message are applied to the document. More details regarding the change manager are disclosed below.

Figure 2:
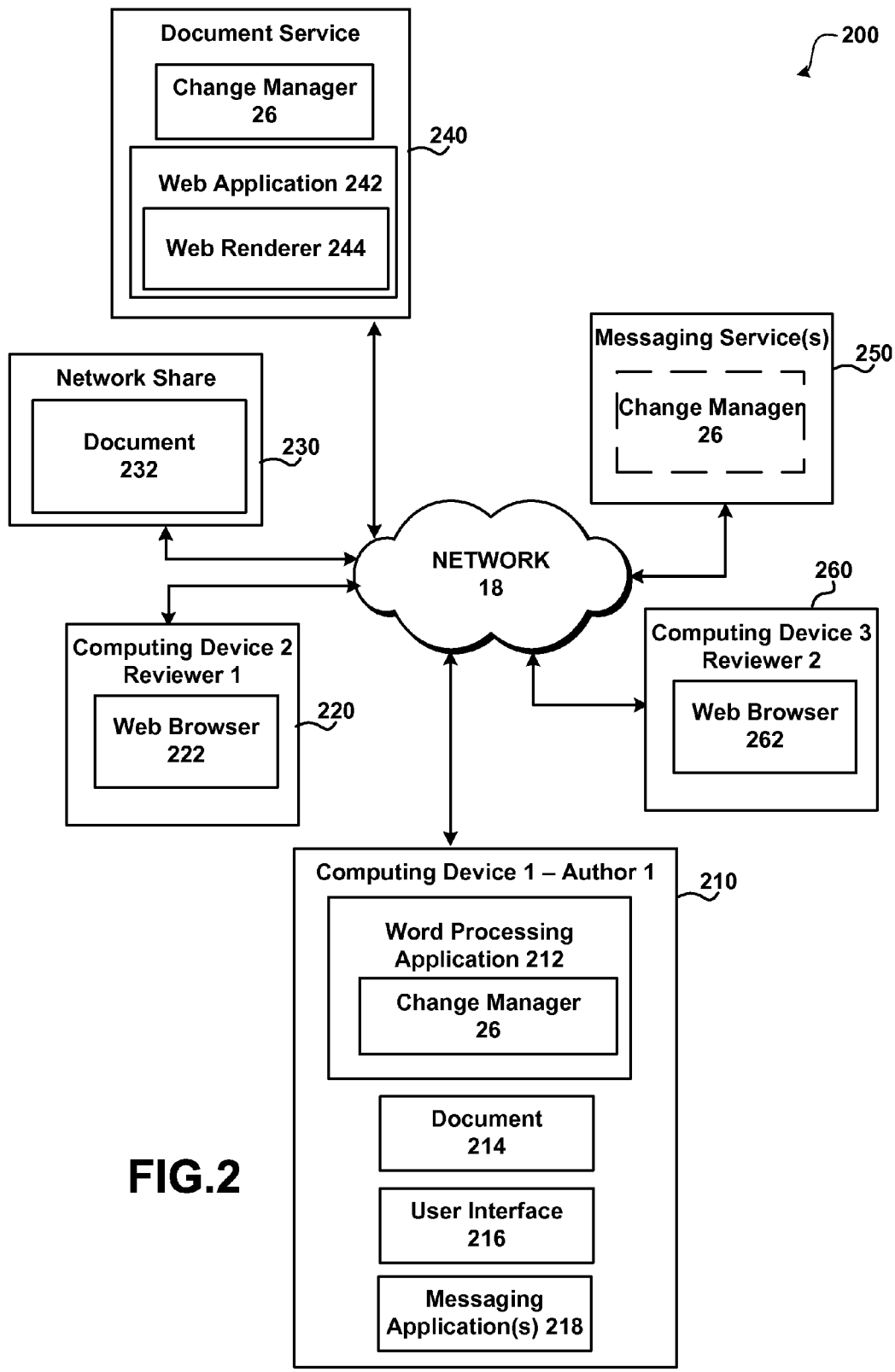
FIG. 2 shows a system for notifying reviewers of changes to documents and making changes to documents using electronic messages.

FIG. 2 shows a system for notifying reviewers of changes to documents and making changes to documents using electronic messages. As illustrated, system 200 includes computing device 1 (210), computing device 2 (220), network share 230, document service 240, messaging service 250 and computing device 3 (260).

The computing devices may be any type of computing device that is configured to perform the operations relating to using electronic messages for making changes to documents. For example, some of the computing devices may be: mobile computing devices (e.g. cellular phones, tablets, smart phones, laptops, and the like); desktop computing devices and servers. Some computing devices may be arranged to provide an online cloud based service (e.g. document service 240 that is configured for interacting with documents online), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, computing device 3, network share 230, document service 240 and messaging service 250.

Computing device 1 includes word processing application 212, document 214, user interface 216 and messaging application 218. As illustrated, computing device 1 is used by a user to interact with documents, such as document 214, documents in a network share (e.g. document 232) and the like.

User interface (UI) 216 is used to interact with a document, such as document 214. One or more user interfaces of one or more types may be used to interact with the document. For example, UI 216 may include the use of a context menu, a menu within a menu bar, a menu item selected from a ribbon user interface, a graphical menu, and the like. Generally, UI 216 is configured such that a user may easily interact with a document. For example, a user may simply select an option within UI 216 that creates new electronic messages that are addressed to other reviewers that are collaborating on a document that include the changes to the document within the body of the electronic messages. Upon receipt, the reviewers may accept/reject changes and/or make comments/text modifications to the document changes that are contained within the email.

Messaging application 218 may be a client based application, such as an email application, a Instant Messaging Application, a social media application, and the like. Generally, messaging application 218 may be used to send electronic messages of one or more types to the reviewers that are collaborating on the document. A network based messaging application may be used in addition to messaging application(s) 218 or instead of one or more of the different messaging applications. For example, a web interface may be used to access a messaging service.

Change manager 26 determines the changes made to a document by an editor and creates an electronic message that includes a summary of the changes. Change manager 26 sends this message to one or more of the reviewers of the document. For example, a document may be collaborated on by author 1 using computing device 1, reviewer 1 using computing device 2 and reviewer 2 using computing device 3. Author 1 may edit a document, such as document 232 on network share 230 that requires input from one or more reviewers (e.g. Reviewer 1 and Reviewer 2). The electronic message(s) including the changes may be created automatically in response to the changes and/or manually (e.g. selection of a user interface option through UI 216). According to an embodiment, the electronic messages are emails. The electronic messages may also be a combination. For example, Reviewer 1 may specify to receive an email message with changes and a text message with the changes, whereas Reviewer 2 specifies to receive email messages with the changes. Change manager 26 formats the electronic messages based on a type of message being created. For example, emails may include more information as compared to text messages. When the electronic message created is a text message, the changes to the document may be spread out among a plurality of text messages (e.g. each change included within a different text message). According to an embodiment, when the electronic message created is an email, then the email includes each of the changes that is to be reviewed by the reviewer along with an entry point for comments and a link that may be accessed to accept/reject changes. Other information may also be included (e.g. summary of changes, contextual information, links to open the document, and the like) (See FIGS. 3-7 and related discussion for more examples). In response to receiving a reply to an electronic message that was sent to a reviewer, change manager 26 parses the electronic message and applies the changes to the document. According to an embodiment, the document is stored in a shared location. A local copy may be kept on a local computing device and synchronized with the shared location. Change manager 26 may include functionality for sending/receiving messages and/or may use functionality of other message applications, such as message service 250 and/or a client message application(s) 218.

A network share 230 may be used to store information relating to one or more documents. Network share 230 is accessible by the computing devices that interact with a document. The network share may be associated with an online service that supports online access/interaction with a document. For example, an online service such as document service 240 may provide online users with the ability to interact/modify documents such as word processing documents, spreadsheets, slides, and the like.

A messaging service(s) 250 may be used to process electronic messages between one or more computing devices, such as computing device 1, computing device 2 and computing device 3. The messaging service(s) 250 may be configured to process different message types, such as SMS, MMS, email, messages for social networks and the like. Messaging service 250 may be configured with the functionality of change manager 26 and one or more message types may be used to communicate the electronic messages with the editors on a document, such as document 232. As discussed above, a combination of message types may also be used. For example, one editor may receive an email with the document changes while another editor may receive an SMS message with one or more of the changes. According to an embodiment, email is a default message type. A preferred message type may also be configured for the different editors. For example, each user may designate their preferred communication method (e.g. email, SMS . . . ).

Computing device 2 and computer device 3 include one or more applications, such as a web browser (222, 262) that may be configured to access a messaging services, such as a web based email service and to interact with the document through document service 240. For example, a web browser may be used to access an electronic message through an email service and then perform edits/selections within that electronic message to affect changes to a document, such as document 232 stored in network share 230. This email service then sends the reply back to the sender such that the changes made in the reply are incorporated into the document.

Document service 240 includes change manager 26 and web application 242 that comprises web renderer 244. According to an embodiment, document service 240 is configured as an online service that is configured to provide services relating to displaying an interacting with electronic documents, such as word processing document, spreadsheets, slides and the like. Web application 242 is configured for receiving and responding to requests relating to documents. For example, document service 240 may access document 232 that is stored on network share 230. Web application 242 is operative to provide an interface to a user of a computing device, such as computing device 2, to interact with a document accessible via network 18. Web application 242 may communicate with other servers that are used for performing operations relating to the document service.

Document service 240 receives requests from computing devices, such as computing devices 1-3. A computing device may transmit a request to document service 240 to interact with a document, such as a collaborated document that is being reviewed/edited by more than one author/reviewer. In response to such a request, Web application 242 obtains the document from a location, such as network share 230. The document to display is converted into a markup language format, such as the ISO/IEC 29500 format. The document may be converted by document service 240 or by one or more other computing devices. Once the Web application 242 has received the markup language representation of the document, the document service utilizes the spreadsheet Web renderer 244 to convert the markup language formatted document into a representation of the document that may be rendered by a Web browser application, such as Web browser 222 on computing device 2 and Web browser 262 on computing device 3. The rendered document appears substantially similar to the output of the word processing application 212 on computing device 1 when utilized to view the same document. Once Web renderer 244 has completed rendering the file, it is returned by the document service 240 to the requesting computing device where it may be rendered by the Web browser 222.

The Web renderer 244 is also configured to render into the markup language file one or more scripts for allowing the user of a computing device, such as computing device 2 to interact with the document within the context of the Web browser 22. Web renderer 244 is operative to render script code that is executable by the Web browser application 222 into the returned Web page. The scripts may provide functionality, for instance, for allowing a user to change a section of the document and/or to modify values that are related to the document. In response to certain types of user input, the scripts may be executed. When a script is executed, a response may be transmitted to the document service 240 indicating that the document has been acted upon, to identify the type of interaction that was made, and to further identify to the Web application 242 the function that should be performed upon the document. The change manager 26 illustrated in document service 240 and messaging service(s) 250 operate as described with regard to computing device 1 and further defined below.

FIGS. 3-7 show exemplary electronic messages for making changes to a document. FIGS. 3-7 are for exemplary purpose and are not intended to be limiting.

Figure 3:
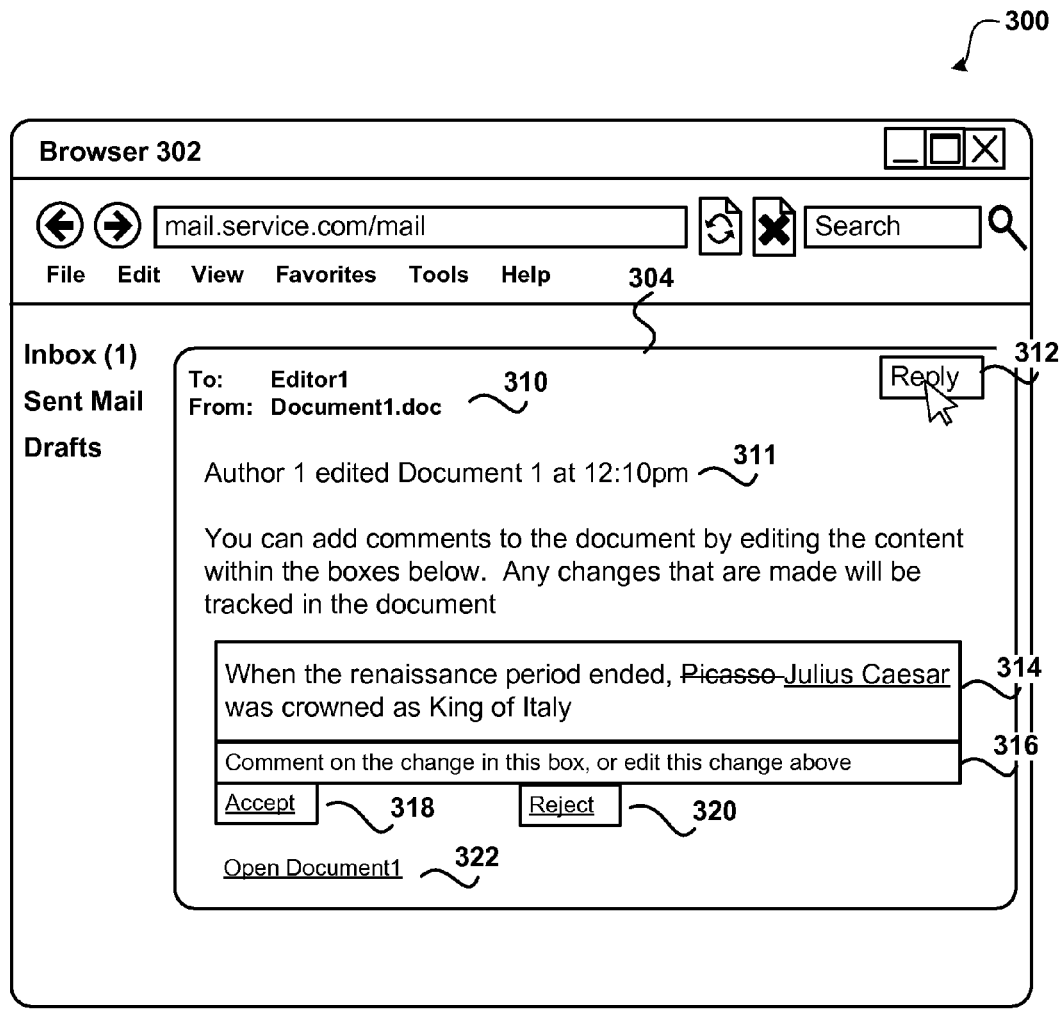
FIG. 3 shows a display of an electronic message including changes made within a document.

FIG. 3 shows a display of an electronic message including changes made within a document. As illustrated, display 300 includes browser 302 that is displaying electronic message 304.

In the example illustrated, a reviewer (Editor 1) has received an email message summarizing changes that were made to a document (Document1.doc) by another author/reviewer. The changes may be made to any type of document. For example, the changes may be made to a text file, a spreadsheet, a web page, a slide presentation, a word processing document, and the like. The electronic message may be accessed a number of ways. For example, a web browser may access an electronic mail service, an email application on a computing device may be configured to receive emails from one or more different services, and the like.

As illustrated, electronic message 304 includes To:/From: fields 310 that show that the changes included within the email are from the Document1.doc document and they are sent to Editor 1 that is a reviewer that is assigned to collaborated on Document1.doc. Editing summary 311 shows that the user Author1 edited Document1.doc at 12:10 pm of the current day. More or less information may be shown in editing summary 311. For example, a number of changes made, a number of paragraphs changed, a number of sections that Editor1 is collaborating on, and the like. Reply 312 is used to reply to the electronic message. Instructions for making changes and adding comments to the changes may also be displayed. Other menu options may also be used to reply to the electronic message.

In the current example, a single change 314 is included in Document1.doc. In other messages, there may be many more changes included. For example, the electronic message may include ten different changes. The number of changes displayed within a single electronic message may also be limited. For example, when a text message is used to deliver changes, each change may be included within a separate text message. Box 316 allows a user to add a comment to the change shown in box 314. The number of changes may also be limited to the changes that relate to the reviewer that is receiving the message. For example, while ten changes may have been made to a document, only five of those changes are related to the reviewer receiving the message.

Accept 318 and Reject 320 links are used to accept/reject the change illustrated in box 314. Open Document1 322 link allows a user to open Document1.doc from within the email.

Figure 4:
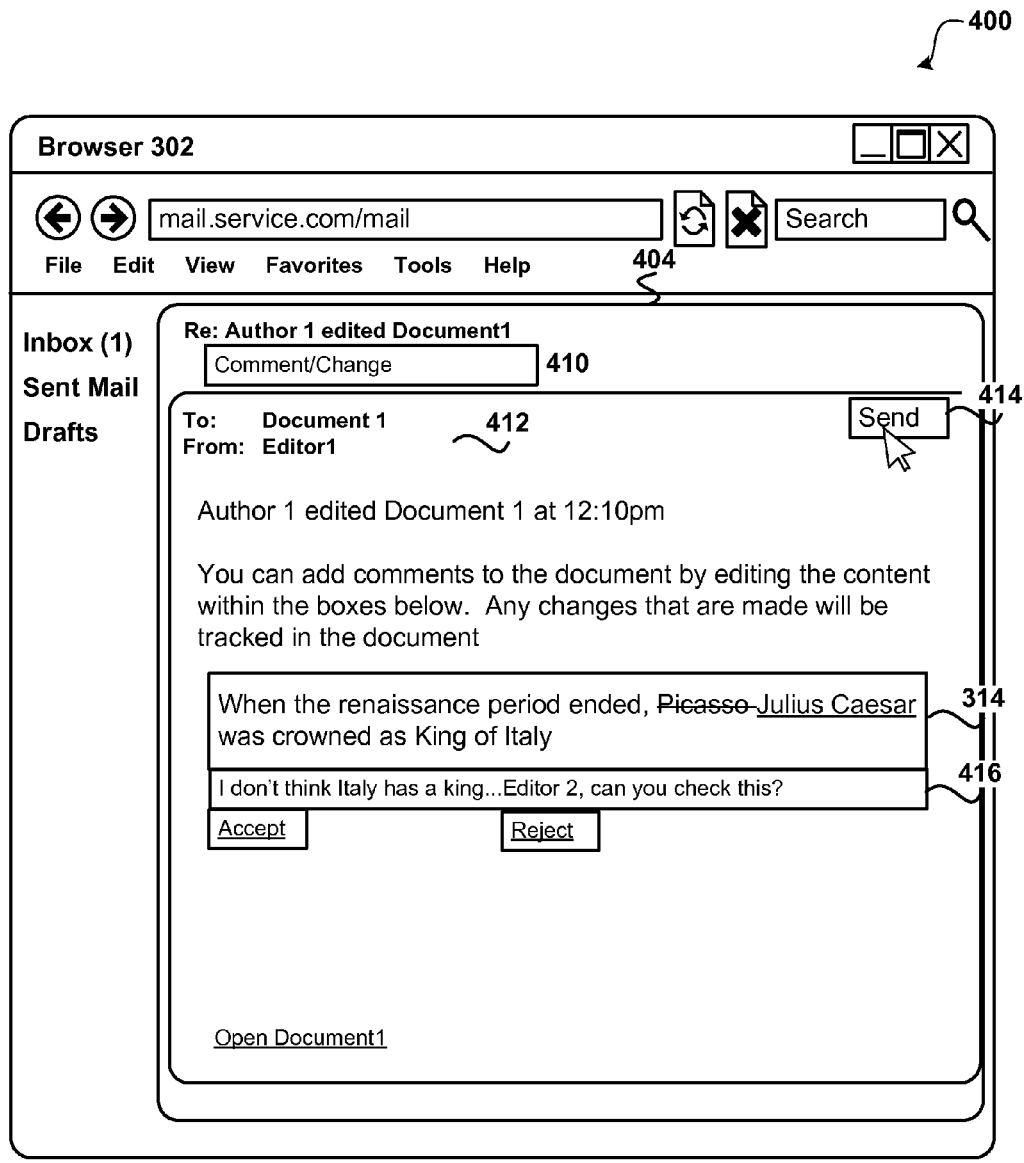
FIG. 4 shows a display of creating a reply to an electronic message to make changes to a document.

FIG. 4 shows a display of creating a reply to an electronic message to make changes to a document. As illustrated, display 400 includes browser 302 that is displaying electronic message 404 that is a reply to the message displayed in FIG. 3.

The To:/From: fields 412 indicate the reply is to be sent to the Document1 address and it is sent by Editor1. In the current example, Editor1 has decided to add a comment in response to change 314. According to an embodiment, the user adds their comment "I don't think Italy has a king . . . Editor 2, can you check this?" to box 416. The comment may be made in other locations. For example, the user could type their comment/change in box 410. The comment/change may be automatically/manually identified. The change manager discussed above could parse the text and determine that the text entered is a comment or change based on the content of the entered text (e.g. doesn't include a number of the words within the change for a comment). An identifier may also be included with the comment/change (e.g. typing "Comment:" or "Change:") to identify that entered text is a change or comment. An identifier may also be used to identify the change to which the comment/change is applied too (e.g. typing "Comment C1:" or "Change C1:" to indicate that the change/comment is for the first change). Once the user has made their comments/changes the uses sends the reply (e.g. selecting button 414) to Document1. After the reply is received, the changes/comments made by Editor1 are included within the document "Document1."

Figure 5:
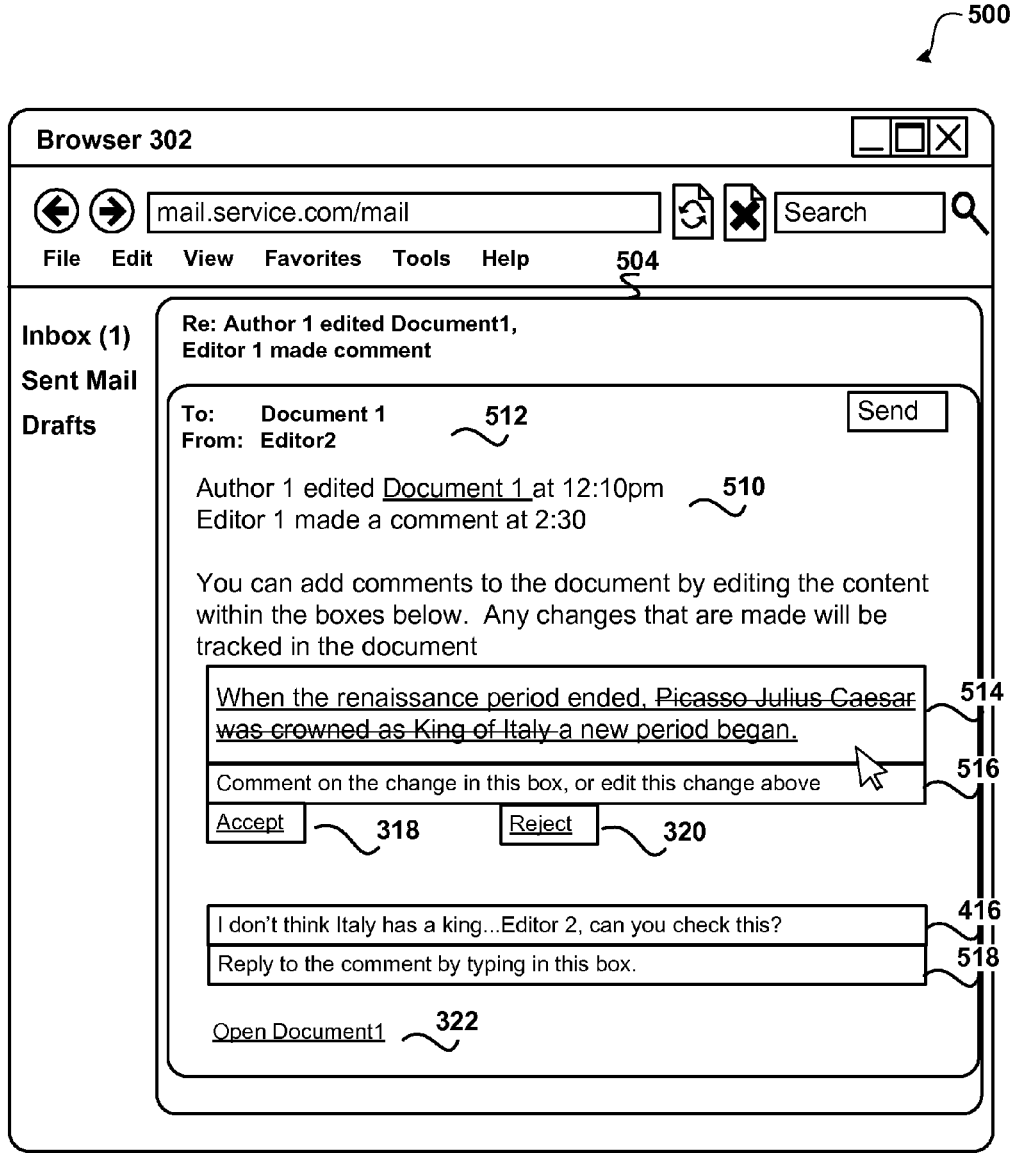
FIG. 5 shows a display of creating a reply to an electronic message to make changes to a document.

FIG. 5 shows a display of creating a reply to an electronic message to make changes to a document. As illustrated, display 500 includes browser 302 that is displaying electronic message 504 that is a reply to the comment added in FIG. 4 and the change displayed in FIG. 3.

The To:/From: fields 512 indicate the reply is to be sent to the Document1 address and it is sent by Editor2. Editing summary 510 shows that Author 1 edited the document and Editor 1 made a comment. In the current example, Editor2 has decided to make changes to the change originally made by Author 1. In the message 504, a reply to comment box 516 is shown below change box 514 and another comment box 518 is shown below the comment 416 that was entered by Editor 1.

Figure 6:
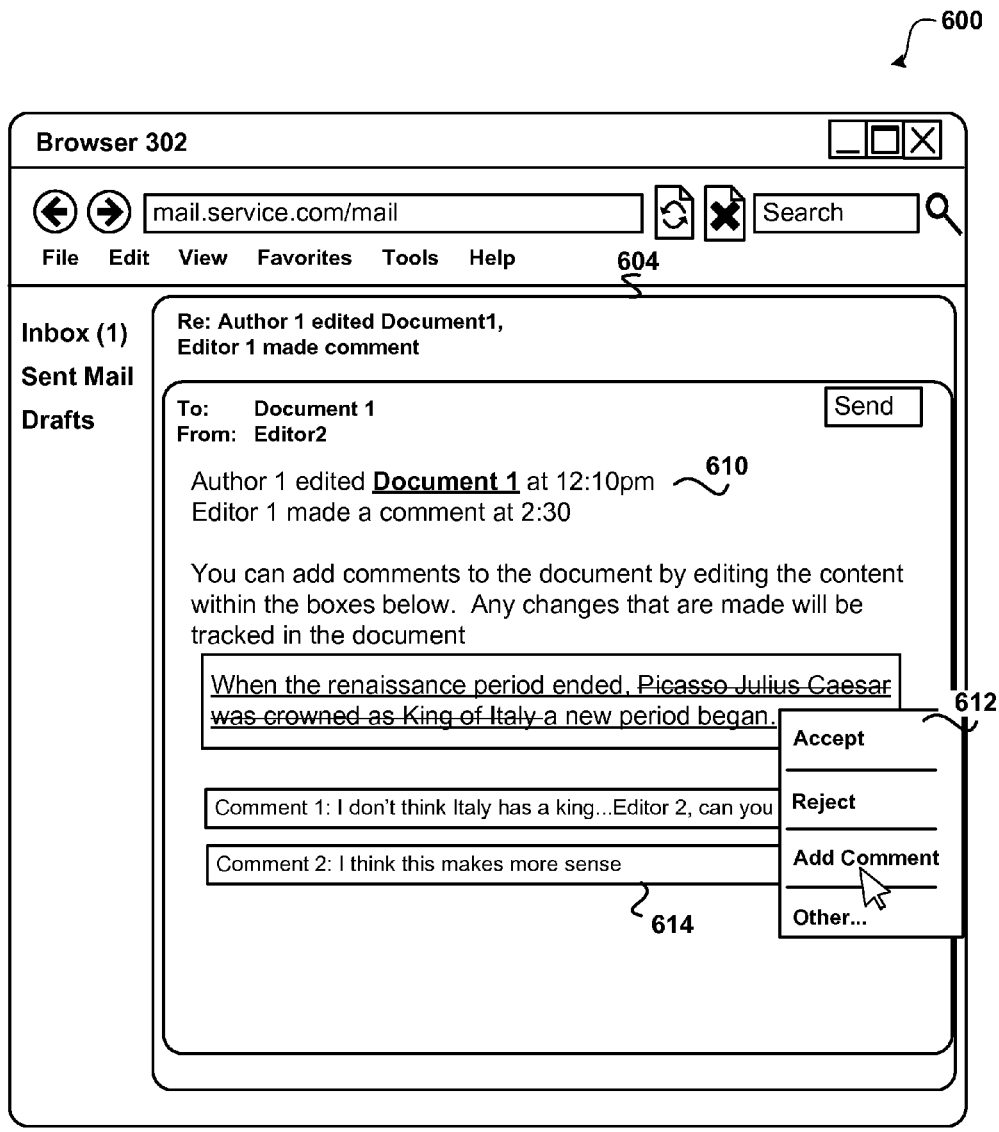
FIG. 6 shows a display of accepting/rejecting changes and adding comments in a reply to an electronic message to make changes to a document.

FIG. 6 shows a display of accepting/rejecting changes and adding comments in a reply to an electronic message to make changes to a document. As illustrated, display 600 includes browser 302 that is displaying electronic message 604 that is a reply to the comment added in FIG. 4 and the change displayed in FIG. 3.

Editing summary 610 shows that Author1 edited the document and Editor1 made a comment. Editing summary 610 also includes a link to Document 1 directly within the editing summary that may be used to open Document 1 from the shared location. In the current example, Editor2 has decided to make changes to the change originally made by Author1 and also add a comment 614. As previously mentioned, different input methods may be used to determine the actions to perform. In the current example, option menu 612 is used to select options relating to the electronic message (e.g. selecting Add Comment to add comment 614).

Figure 7:
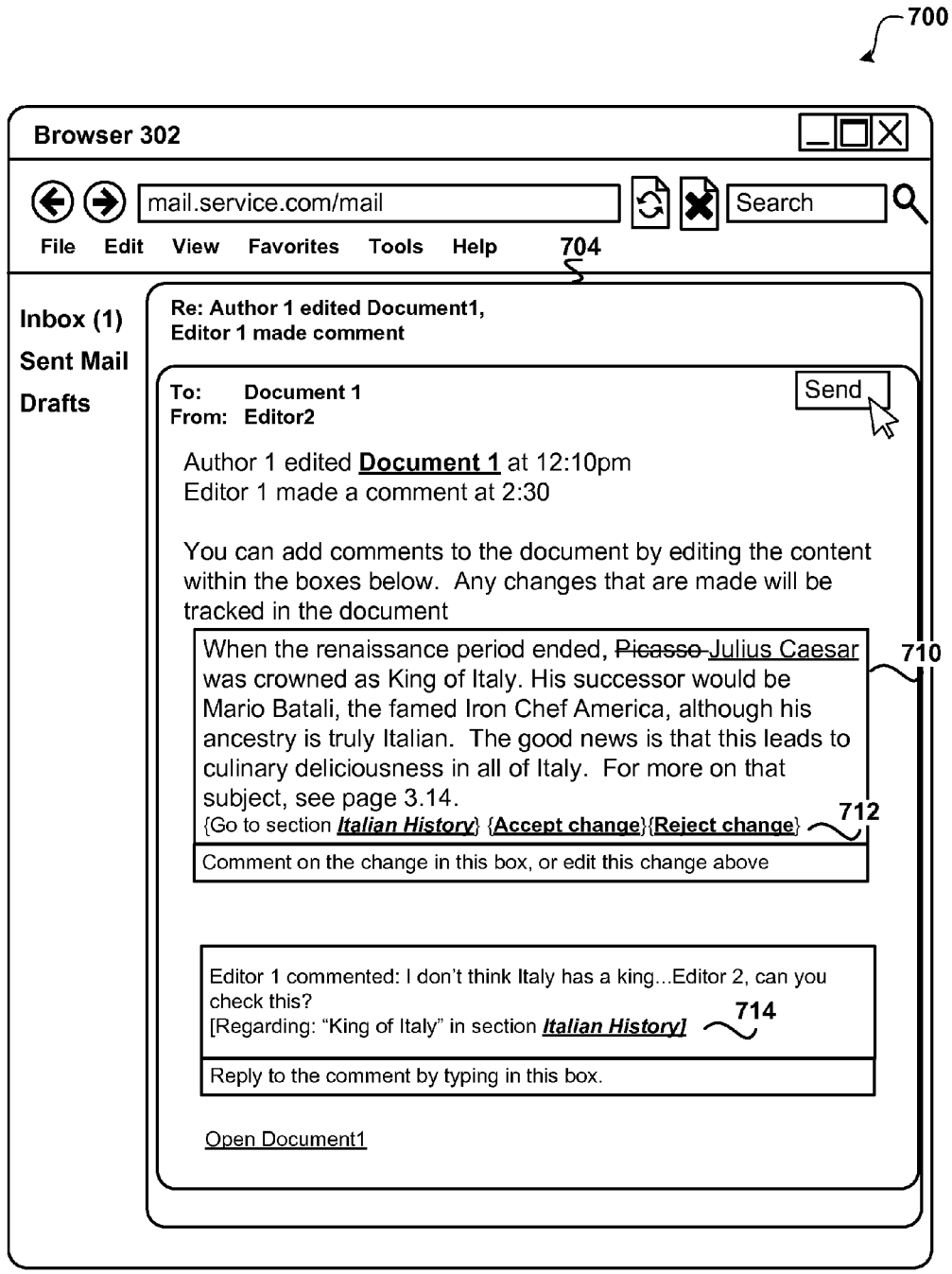
FIG. 7 shows a display of accepting/rejecting changes and adding comments in a reply to an electronic message to make changes to a document.

FIG. 7 shows a display of accepting/rejecting changes and adding comments in a reply to an electronic message to make changes to a document. As illustrated, display 700 includes browser 302 that is displaying electronic message 704 that is a reply to the comment added in FIG. 4 and the change displayed in FIG. 3.

Electronic message 704 includes change 710 that shows the change made by Author 1 and options 712. Options 712 includes an option to go to the section of the document where the change was made as well as options to accept/reject the change. Comment 714 includes information in addition to the comment that provides context for the comment.

Figure 8:
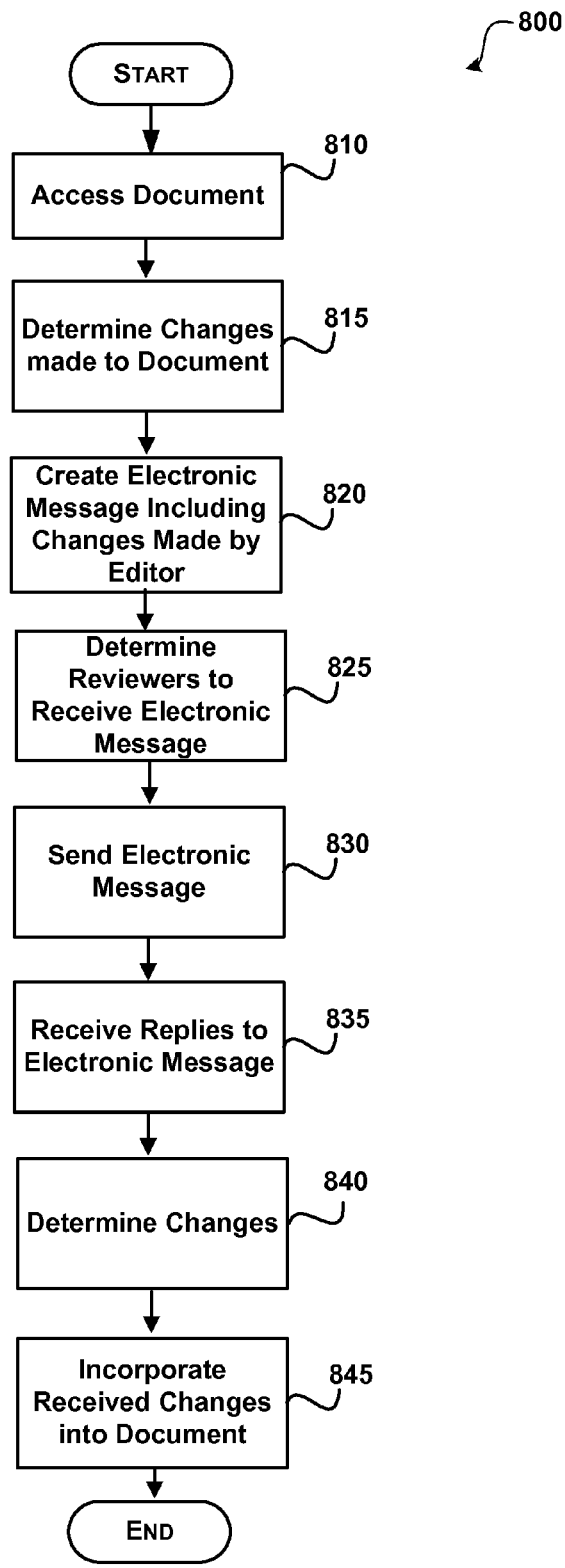
FIG. 8 illustrates a process for sending electronic messages with changes and receiving changes to apply to a document.
Figure 9:
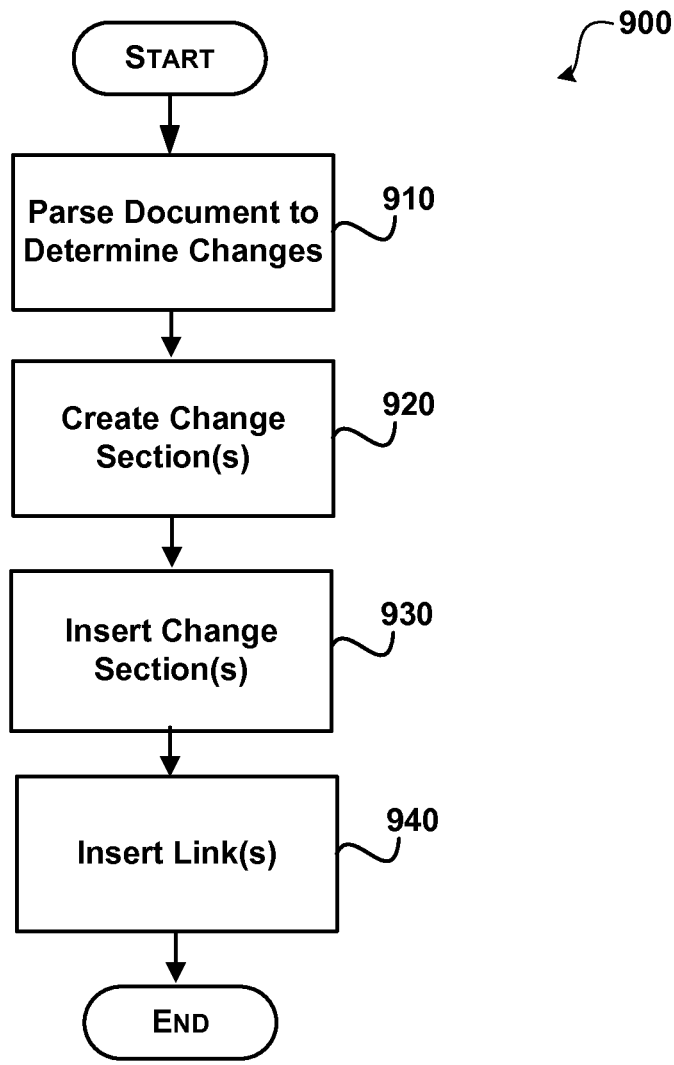
FIG. 9 shows a process for creating an electronic message including changes made to a document.

FIGS. 8 and 9 show an illustrative process for making changes to a document using electronic messages. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 8 illustrates a process for sending electronic messages with changes and receiving changes to apply to a document.

After a start block, process 800 moves to operation 810, where the document to which changes have been made is accessed.

Flowing to operation 815, the changes to the document are determined (See FIG. 9 and related discussion). Generally, the changes relate to content changes of the document. The changes, however, may also include changes to formatting and/or metadata that is associated with the document.

Moving to operation 820, an electronic message is created that includes the changes made to the document within the body of the electronic message. According to an embodiment, each of the changes include portions of the document that come before the change and after the change in order to help provide context for the change. The message may include a summary section that provides information on the changes to the document over a period of time and options for accepting/rejecting changes, adding comments, opening the document from within the message, and the like. Different versions of the electronic message may also be created. For example, different electronic messages may be created based on the editors of the document such that each editor receives the changes to which they are responsible for reviewing. The different versions may also be created for different devices and/or message types.

Transitioning to operation 825, a determination is made as to what reviewers are to receive an electronic message that contains the changes. Each reviewer on the document may receive the electronic message or a portion of the reviewers may receive the electronic message. For example, the electronic message may be sent to only the reviewers that are authorized to collaborate on the section(s) of the document to which the changes were made. The determination may also be made as to what version of the electronic message to send to the reviewers.

Flowing to operation 830, the electronic message is sent to the determined reviewers. The message is sent using the appropriate method depending on the type of message (e.g. email, SMS, MMS, and the like).

Moving to operation 835, one or more replies may be received in response to the sent electronic message(s). For example, a reply may be received from all/portion of the reviewers.

Transitioning to operation 840, the changes that are contained within the reply message are determined The changes may include one or more comments and/or additions/deletions to the changes that were included in the electronic message that was received by the reviewer.

Flowing to operation 845, the changes are incorporated into the document. According to an embodiment, the changes are made to the document at a shared location. For example, the document is stored at a shared location that is accessible by each of the reviewers/authors. According to another embodiment, the changes may be supplied to a computing device that incorporates the changes into a document that is not shared.

FIG. 9 shows a process for creating an electronic message including changes made to a document.

After a start block, the process moves to operation 910, where the document is parsed to determine the changes made by one or more reviewers/authors. Many different methods may be used for determining the changes. For example, an application may keep track of the changes within the document, a difference comparison may be made between the current state of the document and a previous version of the document, and the like.

Flowing to operation 920, a different change section is created for each change within the electronic message. For example, FIGS. 3-7 show that each change is included within a separate section of the email (e.g. change box 314) and includes a portion of text before and after the change. According to an embodiment, a comment space (e.g. comment box 316) is provided below the display of the change within the message.

Moving to operation 930, the change sections are inserted into the electronic message(s). Varying levels of formatting may be used for the message(s). For example, some messages may include more detailed formatting while other messages (e.g. text messages) include little or no formatting. The formatting may also be controlled by a user. For instance, a user may specify a level of formatting to be used in an electronic message. This may be specified by the user receiving the electronic messages and/or specified by another user (e.g. administrator, main author of document).

Transitioning to operation 940, links to content are included within the message. According to an embodiment, a link is inserted to: access a portion or the full document; accept a change; and reject a change. Other links may also be included/excluded. For example, a link may be inserted to: accept all changes; reject all changes; access a related document; access a document service; and the like.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for making document changes using electronic messages, comprising:
    creating an electronic message that includes a change made to a document that is viewable within a body of the electronic message, wherein the document is collaborated on by reviewers;
    sending the electronic message to at least a portion of the reviewers that includes the change made to the document within the body of the electronic message;
    receiving a reply to the electronic message that includes a received change made directly from within the electronic message without editing the document that is to be incorporated into the document; and
    after receiving the reply, automatically incorporating the received change into the document.

2. The method of claim 1, further comprising determining the reviewers that are to receive the document based on whether the change is within a section of the document that is assigned to each of the reviewers.

3. The method of claim 1, further comprising accessing the document from a shared data location.

4. The method of claim 1, wherein creating the electronic message comprises including a first selectable option to accept the change and a second selectable option to reject the change.

5. The method of claim 1, wherein creating the electronic message comprises including a comment area that is used to enter a comment for the change made to the document.

6. The method of claim 1, wherein creating the electronic message comprises including a predetermined amount of content of the document before each change and after each change.

7. The method of claim 3, wherein creating the electronic message comprises including a link within the electronic message that is used to open the document from the shared data store.

8. The method of claim 1, wherein receiving the reply to the electronic message that includes the received change that is to be incorporated into the document comprises determining when the received change is at least one of: a comment to the change and a revised change to the change included within the electronic message.

9. The method of claim 1, wherein creating the electronic message comprises including a section link that when selected opens the document at a location of a section that corresponds to the section link.

10. The method of claim 1, wherein the reply is sent to a document service that hosts the document.

11. A computer-readable storage medium, excluding a signal, storing computer-executable instructions for making document changes using electronic messages, comprising:
    creating an electronic message that includes: a change made to a shared document and a comment area that is used to enter a comment that is to be included within the document for the change made to the document within a body of the electronic message, wherein the document is collaborated on by reviewers;
    sending the electronic message to at least a portion of the reviewers that includes the change made to the document within the body of the electronic message;
    receiving a reply to the electronic message that includes a received change that is to be incorporated into the document that is made without editing the document; and
    automatically incorporating the received change into the document.

12. The computer-readable storage medium of claim 11, further comprising determining the reviewers that are to receive the document based on whether the change is within a section of the document that is assigned to each of the reviewers.

13. The computer-readable storage medium of claim 11, wherein creating the electronic message comprises including a first selectable option to accept the change and a second selectable option to reject the change and a selectable option to open the document.

14. The computer-readable storage medium of claim 11, wherein creating the electronic message comprises including a predetermined amount of content of the document before each change and after each change and an indicator that specifies a section of the document where the change was made.

15. The computer-readable storage medium of claim 11, wherein receiving the reply to the electronic message that includes the received change that is to be incorporated into the document comprises determining when the received change is at least one of: a comment to the change and a revised change to the change included within the electronic message.

16. The computer-readable storage medium of claim 11, wherein the reply is sent to a document service that hosts the document.

17. A system for making document changes using electronic messages, comprising:
    a network connection that is configured to connect to a network;
    a processor, memory, and a computer-readable storage medium;
    an operating environment stored on the computer-readable storage medium and executing on the processor;
    a document; and
    a change manager operating in conjunction with the operating environment that is configured to perform actions comprising:
        creating an electronic message that includes: a change made to a shared document and a comment area that is used to enter a comment that is to be included within the document for the change made to the document within a body of the electronic message, wherein the document is collaborated on by reviewers;
        sending the electronic message to at least a portion of the reviewers that includes the change made to the document within the body of the electronic message;
        receiving a reply to the electronic message that includes a received change that is to be incorporated into the document that is made without editing the document; and
        incorporating the received change into the document.

18. The system of claim 17, wherein creating the electronic message comprises including a first selectable option to accept the change and a second selectable option to reject the change and a selectable option to open the document.

19. The system of claim 17, wherein creating the electronic message comprises including a predetermined amount of content of the document before each change and after each change and an indicator that specifies a section of the document where the change was made.

20. The system of claim 17, wherein receiving the reply to the electronic message that includes the received change that is to be incorporated into the document comprises determining when the received change is at least one of: a comment to the change and a revised change to the change included within the electronic message.

* * * * *